United States Patent [19]

Heitner

[11] Patent Number: 5,141,730
[45] Date of Patent: Aug. 25, 1992

[54] STABILIZATION OF HYDROXYLAMINE SOLUTIONS

[75] Inventor: Howard I. Heitner, Stamford, Conn.

[73] Assignee: American Cyanamid Company, Stamford, Conn.

[21] Appl. No.: 704,479

[22] Filed: May 23, 1991

[51] Int. Cl.$^5$ .............................................. C01B 21/14
[52] U.S. Cl. ..................................... 423/387; 423/265; 423/514
[58] Field of Search .................. 564/2, 301; 423/387, 423/265, 514

[56] References Cited

U.S. PATENT DOCUMENTS

| | | | |
|---|---|---|---|
| 3,145,082 | 8/1964 | Rausch et al. | 423/275 |
| 3,480,391 | 11/1969 | Carlos | 423/387 |
| 3,544,270 | 12/1970 | Carlos | 423/265 |

FOREIGN PATENT DOCUMENTS

| | | | |
|---|---|---|---|
| 3345734A | 12/1983 | Fed. Rep. of Germany | 423/387 |
| 3343600A | 6/1985 | Fed. Rep. of Germany | 423/387 |
| 74014640 | 9/1974 | Japan | 423/387 |
| 69841 | 10/1981 | Japan | 423/387 |
| 0100908 | 6/1982 | Japan | 423/387 |
| 60-260541A | 12/1985 | Japan | 564/2 |

Primary Examiner—Richard L. Raymond
Assistant Examiner—Shailendra Kumar
Attorney, Agent, or Firm—Frank M. Van Riet

[57] ABSTRACT

Solutions of an hydroxylamine or an at least partially neutralized hydroxylamine salt are stabilized against decomposition by adding thereto a water-soluble alkali metal, alkaline earth metal or ammonium thiosulfate.

14 Claims, No Drawings

STABILIZATION OF HYDROXYLAMINE SOLUTIONS

BACKGROUND OF THE INVENTION

Solutions of hydroxylamine are inherently unstable, decomposing by internal oxidation-reduction to form ammonia and nitrogen or nitrogen oxides. The decomposition is accelerated by high pH and the presence of catalytic amounts of cations such as Fe(II), Ni(II), and Cu(II). Aqueous solutions thereof are commonly produced by at least the partial neutralization of the hydroxylamine salt, such as the hydrochloride or sulfate, with an alkali metal hydroxide or ammonia. These solutions are widely used in synthesis work, but the instability of the free hydroxylamine in these solutions limits its utility in cases where storage is necessary.

There have been a number of attempts reported to stabilize solutions of an hydroxylamine or an at least partially neutralized hydroxylamine salt in order to achieve a longer shelf life. Compounds that have been reported to be stabilizers for such solutions include various chelating agents (such as the tetrasodium salt of ethylene diaminetetraacetic acid) (U.S. Pat. No. 3145082); amide oximes (U.S. Pat. No. 3480391); hydroxamic acids (U.S. Pat. No. 3480392); hydroxyureas and hydroxythioureas (U.S. Pat. No. 3544270); hydroxylalkylidene diphosphonic acids (U.S. Pat. No. 3647449); vicinal polyhydroxyphenols (Japanese Patent No. 48/78099); hydroxyquinolines (Japanese Patent No. 57/100908); 1,10-phenantholine (Japanese Patent No. 58/69841); dipyridyl compounds (Japanese Patent No. 58/69842); thiocarboxylic acids (Japanese Patent No. 58/69843); quinoline derivatives (Japanese Patent No. 58/69844); hydroxy substituted flavone (German Patent No. 3343597); anthocyanins (U.S. Pat. No. (4551318); hydroxyl substituted flavan (German Patent No. 3343599); stannic acid (Japanese Patent No. 60/260541); hydroxy substituted anthraquinones (U.S. Pat. No. 4576804); 8-hydroxyquinalidines (U.S. Pat. No. 4629613); and 2,3-dihydrohexano-1,4-lactone (U.S. Pat. No. 4634584).

SUMMARY OF THE INVENTION

The present invention provides stabilized solutions of an hydroxylamine or an at least partially neutralized hydroxylamine salt which are stable over a prolonged period, minimizing the decomposition of hydroxylamine. This is achieved by the addition of small amounts of thiosulfate salts.

DESCRIPTION OF THE INVENTION INCLUDING PREFERRED EMBODIMENTS

The thiosulfate additives of the present invention are the water-soluble thiosulfates, e.g. the alkali metal thiosulfates, examples of which include sodium thiosulfate; potassium thiosulfate etc. ammonium thiosulfate; the alkaline earth metal thiosulfates such as calcium thiosulfate, magnesium thiosulfate; etc. The preferred thiosulfate is sodium thiosulfate.

The amount of stabilizer to be used to stabilize the hydroxylamine or the at least partially neutralized hydroxylamine salt solution ranges from about 0.001 to about 100 mole %, based on the hydroxylamine salt. Preferably, the amount of stabilizer ranges from about 0.1 to about 10 mole %, same basis. The aqueous solutions of free hydroxylamine i.e. fully neutralized salt, can be produced by the reaction of a salt of hydroxylamine (such as the hydrochloride, the nitrate, the acetate, the sulfate salt etc.) with an alkali metal hydroxide (such as sodium hydroxide) or with ammonia. The concentration of the hydroxylamine or the at least partially neutralized hydroxylamine salt is usually at least about 1 weight percent of the aqueous solution and can range up to saturation or more, but is generally in the range of from about 3 to about 30 weight percent. It is best to add the thiosulfate to the hydroxylamine salt solution before its neutralization with base, but the thiosulfate can also be added to the at least partially neutralized hydroxylamine salt solution. The temperature during the thiosulfate addition is advantageously kept at from about 5° to about 40° C. The stabilized solutions should be stored at temperatures <40° C., preferably <25° C.

The decomposition of the hydroxylamine in aqueous solutions is quite rapid at above pH 7.0, i.e. in the presence of excess base, providing immediate evolution of the gaseous by-products. It is convenient to test the ability of a compound to stabilize the hydroxylamine solution by monitoring the amount of gas evolved with time. The stabilized solutions are useful in the preparation of hydroxamated polymers e.g. acrylamide polymers.

The following examples are set forth for purposes of illustration only and are not to be construed as limitations on the present invention except as set forth in the appended claims. All parts and percentages are by weight unless otherwise specified.

EXAMPLE 1

(Comparative)

A suitable reaction vessel is equipped with a thermometer, a pressure equalizing addition funnel, a stirring bar and a gas outlet which is connected to an inverted graduated cylinder filled with water. Into the vessel are charged 39.3 parts (0.144 mole) of 30% aqueous hydroxylamine sulfate solution. While maintaining the temperature below 25° C., 23.0 parts (0.288 mole) of 50% aqueous sodium hydroxide solution are added. The vessel is tightly sealed. Vigorous gas evolution is observed and the water is displaced from the graduated cylinder. 920 Ml of gas are evolved over a period of 4.5 hours. The gas is identified by its infrared absorption spectrum as being mainly nitrous oxide indicating the decomposition of the hydroxylamine.

EXAMPLE 2

The procedure of Example 1 is repeated except that 0.23 part of sodium thiosulfate (0.00145 mole) is added to the hydroxylamine sulfate solution before the addition of the sodium hydroxide. No measurable gas (<10 ml) is collected in the cylinder after 16 hours indicating that the hydroxylamine is stabilized.

EXAMPLE 3

Using the same apparatus as in Example 1, 39.3 parts (0.144 mole) of 30% aqueous hydroxylamine sulfate solution are treated with 23.0 parts (0.288 mole) of 50% aqueous sodium hydroxide in the presence of 1 mole % of various stabilizers and the gas evolution is monitored with time. The results are reported in Table I, below.

TABLE I

Hydroxylamine Stabilization Studies
Gas Collection Over Time

| Stabilize Added | ml Gas | Time (Hr.) |
| --- | --- | --- |
| None | 880 | 4.0 |
| None | 970 | 4.5 |
| Sodium Thiosulfate | 10 | 23.3 |
| 8-Quinolinol | 500 | 5.5 |
| 8-Quinolinol | 530 | 7.8 |
| 2-Mercaptobenzimidazole | 690 | 4.7 |
| 2-Mercaptobenzimidazole | 620 | 7.0 |
| 2-Mercaptobenzimidazole | 590 | 7.0 |
| Sodium Diethyl Dithiocarbamate | 600 | 18.2 |
| Sodium Diethyl Dithiophosphate | 220 | 23.0 |
| Sodium Diethyl Dithiophosphate | 670 | 71.0 |
| Sodium Diethyl Dithiophosphate | 560 | 4.0 |
| Tolylbiguanide | 900 | 7.3 |
| Sodium Hydrosulfide | 890 | 6.5 |
| Sodium Hypophosphite | 850 | 21.0 |
| Sodium Metabisulfite | 870 | 5.0 |
| Hydroquinone | 690 | 23.0 |

EXAMPLES 4–7

The procedure of Example 2 is again followed except that the sodium thiosulfate is replaced by an equivalent amount of 4) potassium thiosulfate, 5) ammonium thiosulfate, 6) calcium thiosulfate and 7) magnesium thiosulfate. In each instance, no measurable amount of gas is collected after 14 hours.

We claim:

1. A stabilized solution containing an hydroxylamine or an at least partially neutralized hydroxylamine salt in water and a stabilizing amount of a water-soluble thiosulfate of an alkali metal, alkaline earth metal or ammonia.

2. The hydroxylamine solution of claim 1 wherein the thiosulfate is sodium thiosulfate.

3. The hydroxylamine solution of claim 1 wherein the thiosulfate is potassium thiosulfate.

4. The hydroxylamine solution of claim 1 wherein the thiosulfate is ammonium thiosulfate.

5. The hydroxylamine solution of claim 1 wherein the thiosulfate is calcium thiosulfate.

6. The hydroxylamine solution of claim 1 wherein the thiosulfate is magnesium thiosulfate.

7. The hydroxylamine solution of claim 1 wherein the pH thereof is over 7.0.

8. A process for inhibiting the decomposition of an aqueous solution of an hydroxylamine or an at least partially neutralized hydroxylamine salt which comprises adding to said solution a stabilizing amount of a water-soluble thiosulfate of an alkali metal, alkaline earth metal or ammonia.

9. A process according to claim 8 wherein the thiosulfate is sodium thiosulfate.

10. A process according to claim 8 wherein the thiosulfate is potassium thiosulfate.

11. A process according to claim 9 wherein the thiosulfate ammonium thiosulfate.

12. A process according to claim 8 wherein the thiosulfate is calcium thiosulfate.

13. A process according to claim 8 wherein the thiosulfate is magnesium thiosulfate.

14. A process according to claim 8 wherein the hydroxylamine solution has a pH of over 7.0.

* * * * *